(12) United States Patent
Davis et al.

(10) Patent No.: US 12,714,261 B2
(45) Date of Patent: Aug. 25, 2026

(54) WOOD BOWL FOR A STAND MIXER AND RELATED METHODS

(71) Applicant: WHIRLPOOL CORPORATION, Benton Harbor, MI (US)

(72) Inventors: Noah Alexander Davis, St. Joseph, MI (US); Alok Chandrakant Deshpande, Varese (IT); Christopher J. Eaton, Stevensville, MI (US); Alexandria M. Grall, St. Joseph, MI (US); Timothy Eric Heater, Hartford, MI (US); Lynsey A. Howse, St. Joseph, MI (US); Naveen Jayabalan, Stevensville, MI (US); Hayden Brant Keiser, Benton Harbor, MI (US); Caitlin E. Lindman, Grand Rapids, MI (US); Sheetal Krishen Pandita, Pune (IN); Joseph Snyder, Benton Harbor, MI (US); Marcel Viana de Souza, St. Joseph, MI (US); Stuart W. Athey, Troy, OH (US); Matthew Dale Kammeraad, Holland, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 67 days.

(21) Appl. No.: 18/406,950

(22) Filed: Jan. 8, 2024

(65) Prior Publication Data

US 2025/0221574 A1 Jul. 10, 2025

(51) Int. Cl.

| | |
|---|---|
| ***A47J 43/07*** | (2006.01) |
| ***A47J 43/044*** | (2006.01) |
| ***B27M 3/24*** | (2006.01) |

(52) U.S. Cl.
CPC ......... *A47J 43/0727* (2013.01); *A47J 43/044* (2013.01); *B27M 3/24* (2013.01); *A47J 2043/04454* (2013.01)

(58) Field of Classification Search
CPC ...... B27M 3/24; B27M 3/0013; B27M 3/006; B27M 1/02; B27D 1/08; B27D 1/00; B27D 3/00; B27D 1/04
See application file for complete search history.

(56) References Cited

U.S. PATENT DOCUMENTS 1,357,940 A 11/1920 Lennah
1,436,307 A 11/1922 Drucker
(Continued)

FOREIGN PATENT DOCUMENTS

CN 201879297 U 6/2011
CN 201948594 U 8/2011
(Continued)

*Primary Examiner* — Shawn M Braden
(74) *Attorney, Agent, or Firm* — Price Heneveld LLP

(57) ABSTRACT

A mixing bowl includes a bowl body defining an exterior and an interior cavity and comprising a plurality of lamination segments. The lamination segments consist essentially of wood and are arranged in alternating layers of first and second types along a height of the bowl body with the layers of the first type including respective ones of the lamination segments having widths extending in a first lateral direction with respect to the bowl body and coupled together along joints extending in a second lateral direction with respect to the bowl body. The second lateral direction is perpendicular to the first lateral direction. The layers of the second type include respective ones of the lamination segments having widths extending in the second lateral direction with respect to the bowl body and are coupled together along joints extending in the first lateral direction with respect to the bowl body.

14 Claims, 13 Drawing Sheets

(56) References Cited

U.S. PATENT DOCUMENTS

| | | | | | |
|---|---|---|---|---|---|
| 1,465,383 | A | * | 8/1923 | Walsh | B27M 1/02 16/DIG. 18 |
| 1,772,073 | A | | 8/1930 | Drucker | |
| 2,062,175 | A | * | 11/1936 | Hartman | B44C 3/12 215/382 |
| 2,200,035 | A | | 5/1940 | Meyer | |
| 3,153,433 | A | * | 10/1964 | Ferrara | B27M 3/24 144/350 |
| 3,345,240 | A | * | 10/1967 | O'Herron | B27M 3/24 156/154 |
| 3,448,883 | A | | 6/1969 | Boswell | |
| 3,645,309 | A | | 2/1972 | Canfield | |
| 3,956,542 | A | * | 5/1976 | Roberti | B27D 1/08 144/380 |
| 6,162,312 | A | * | 12/2000 | Abney | B27M 3/0086 156/154 |
| 10,183,461 | B2 | | 1/2019 | Falbo | |

FOREIGN PATENT DOCUMENTS

| | | | | | |
|---|---|---|---|---|---|
| CN | 202698640 | U | | 1/2013 | |
| CN | 103448126 | A | | 12/2013 | |
| CN | 104290167 | A | | 1/2015 | |
| CN | 205306597 | U | | 6/2016 | |
| CN | 207023855 | U | | 2/2018 | |
| CN | 216602369 | U | | 5/2022 | |
| GB | 219509 | A | | 7/1924 | |
| JP | S52115687 | U | | 9/1977 | |
| JP | 409169328 | A | | 6/1997 | |
| JP | 4449065 | B2 | | 4/2010 | |
| WO | WO-2004043214 | A1 | * | 5/2004 | B27M 3/006 |

* cited by examiner

WOOD BOWL FOR A STAND MIXER AND RELATED METHODS

BACKGROUND OF THE DISCLOSURE

The present disclosure generally relates to a combined wooden and metal bowl for a KitchenAid stand mixer, and more specifically, to a wooden bowl with a metal liner that is configured for use with a stand mixer.

SUMMARY OF THE DISCLOSURE

According to one aspect of the present disclosure, a mixing bowl includes a bowl body defining an exterior and an interior cavity and comprising a plurality of lamination segments. The lamination segments consist essentially of wood and are arranged in alternating layers of first and second types along a height of the bowl body with the layers of the first type including respective ones of the lamination segments having widths extending in a first lateral direction with respect to the bowl body and coupled together along joints extending in a second lateral direction with respect to the bowl body. The second lateral direction is perpendicular to the first lateral direction. The layers of the second type include respective ones of the lamination segments having widths extending in the second lateral direction with respect to the bowl body and are coupled together along joints extending in the first lateral direction with respect to the bowl body.

According to another aspect of the present disclosure, a method for making a mixing bowl includes assembling a plurality of lamination layers from a respective plurality of wood boards. Each of the wood boards define a width across a grain structure of the board and are coupled together at respective joints therebetween extending along respective lengths of the wood boards. The lamination layers each have a height corresponding with a thickness of the wood boards in directions normal to the widths and lengths thereof. The method also includes joining the lamination layers together in a direction corresponding with the respective heights of the lamination layers to form a blank. The lamination layers are successively arranged in alternating first and second orientations. The first orientation is such that the respective lengths of the wood boards extend in a first direction, and the second orientation is such that the respective lengths of the wood boards extend in a second direction perpendicular to the first direction. The method further includes shaping the blank into a bowl body defining an exterior and an interior cavity.

According to another aspect of the present disclosure, a mixing bowl for a stand mixer includes a bowl body defining an exterior and an interior cavity and shaped from a blank having plurality of lamination layers. Each of the lamination layers are assembled from a respective plurality of wood boards. Each of the wood boards defines a width across a grain structure of the board and coupled together at respective joints therebetween extending along respective lengths of the wood boards. The lamination layers each have a height corresponding with a thickness of the wood boards in directions normal to the widths and lengths thereof. The lamination layers are joined together in a direction corresponding with the respective heights of the lamination layers to form the blank. The lamination layers are successively arranged in alternating first and second orientations. The first orientation has the respective lengths of the wood boards extending in a first direction, and the second orientation has the respective lengths of the wood boards extending in a second direction perpendicular to the first direction. The mixing bowl for the stand mixer further includes a coating applied over at least a majority of the bowl body and a mounting base coupled with the bowl body on the exterior thereof and configured to couple the mixing bowl with a retention feature of a stand mixer.

According to another aspect of the present disclosure, a mixing bowl for a stand mixer includes an outer body consisting essentially of wood and defining an exterior and an interior cavity and a liner consisting essentially of metal and coupled within the interior cavity of the outer body so as to define an interior surface of the mixing bowl. A mounting base is coupled with the outer body on the exterior thereof and is configured to couple the mixing bowl with a retention feature of the stand mixer.

According to another aspect of the present disclosure, a mixing bowl for a stand mixer includes an outer body consisting essentially of wood and defining an exterior, an interior cavity, an upper edge between the exterior and the interior cavity, and a groove extending inwardly from an interior wall defining the interior cavity adjacent the upper edge. The mixing bowl also includes a liner having an upper flange, consisting essentially of metal, and being coupled within the interior cavity of the outer body at least by receipt of the upper flange within the groove of the outer body so as to define an interior surface of the mixing bowl.

According to yet another aspect of the present disclosure, a method for making a mixing bowl for a stand mixer can include coupling a metal liner within an interior cavity of an outer body so as to define an interior surface of the mixing bowl. The outer body consists essentially of wood and defines an exterior and the interior cavity. The method further includes coupling a mounting base with the outer body on the exterior thereof. The mounting base is configured to couple the mixing bowl with a retention feature of a stand mixer.

These and other features, advantages, and objects of the present disclosure will be further understood and appreciated by those skilled in the art by reference to the following specification, claims, and appended drawings.

Figure 1:
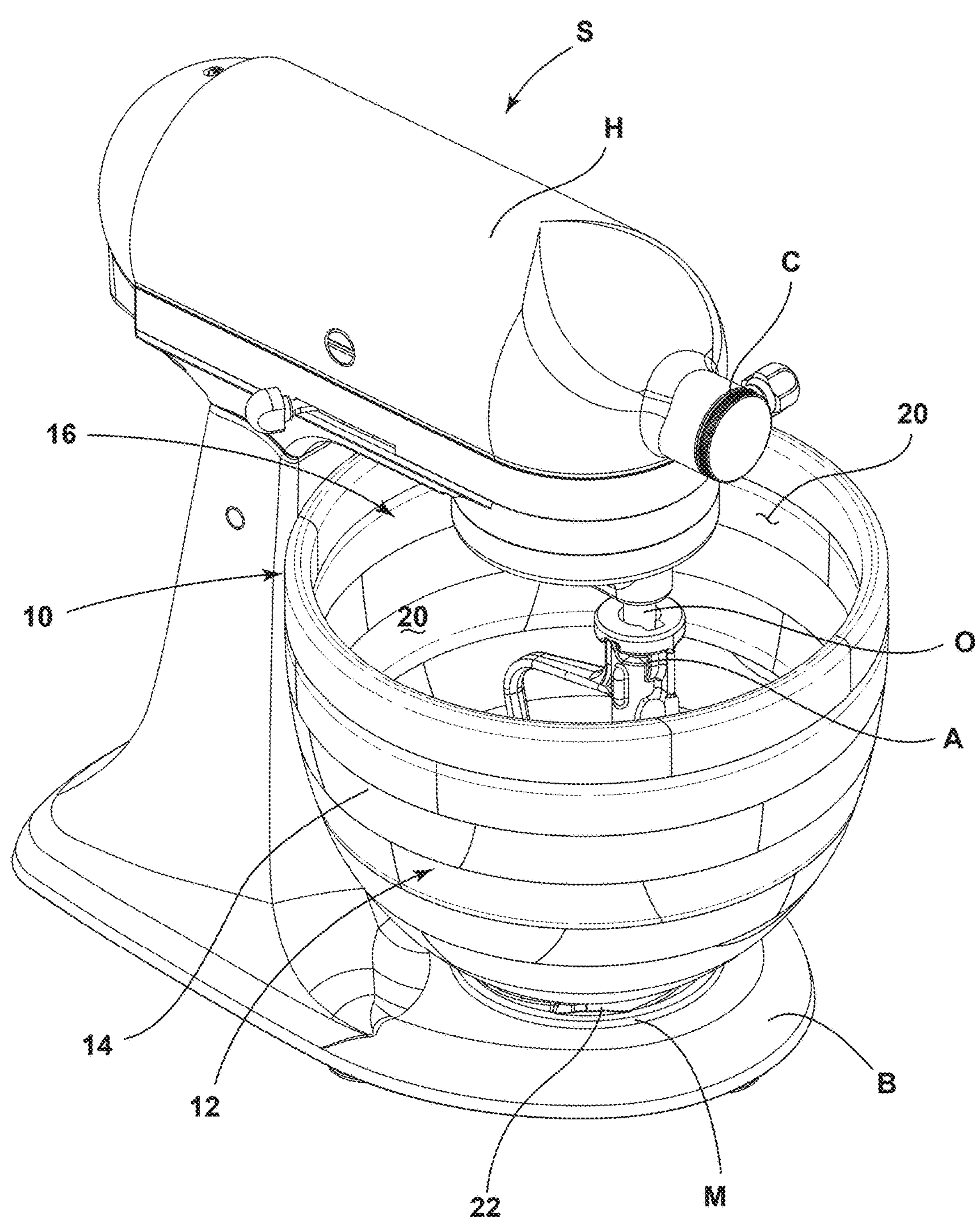
FIG. 1 is a perspective view of a wooden mixing bowl according to an aspect of the present disclosure shown in use in connection with a stand mixer.

The components in the figures are not necessarily to scale, emphasis instead being placed upon illustrating the principles described herein.

DETAILED DESCRIPTION

The present illustrated embodiments reside primarily in combinations of method steps and apparatus components related to a mixing bowl. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Ordinal modifiers (i.e., "first", "second", etc.) may be used to distinguish between various structures of a disclosed article in various contexts, but such ordinals are not necessarily intended to apply to such elements outside of the particular context in which they are used and that, in various aspects different ones of the same class of elements may be identified with the same, context-specific ordinal. In such instances, other particular designations of the elements are used to clarify the overall relationship between such elements. Ordinals are not used to designate a position of the elements, nor do they exclude additional, or intervening, non-ordered elements or signify an importance or rank of the elements within a particular class.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "about", "approximately", or "substantially" are intended to mean that a value of a parameter is close to a stated value or position. However, minor differences may prevent the values or positions from being exactly as stated. Thus, unless otherwise noted, differences of up to ten percent (10%) for a given value are reasonable differences from the ideal goal of exactly as described. In many instances, a significant difference can be when the difference is greater than ten percent (10%), except as where would be generally understood otherwise by a person of ordinary skill in the art based on the context in which such term is used.

Referring to FIGS. 1-11 reference numeral 10 refers to a mixing bowl. The mixing bowl 10 includes a bowl body 12 defining an exterior 14 and an interior cavity 16 and comprising a plurality of lamination segments 50. The lamination segments 50 consist essentially of wood and are arranged in alternating layers 52 of first and second types 50*a* and 50*b* along a height H of the bowl body 12 with the layers 52*a* of the first type including respective ones of the lamination segments 50 having widths 54 extending in a first lateral direction 56 with respect to the bowl body 12 and coupled together along joints 58 extending in a second lateral direction 60 with respect to the bowl body 12. The second lateral direction 60 is perpendicular to the first lateral direction 56. The layers 52*b* the second type include respective ones of the lamination segments 50 having widths 54 extending in the second lateral direction 60 with respect to the bowl body 12 and are coupled together along joints 58 extending in the first lateral direction 56 with respect to the bowl body 12.

Figure 2:
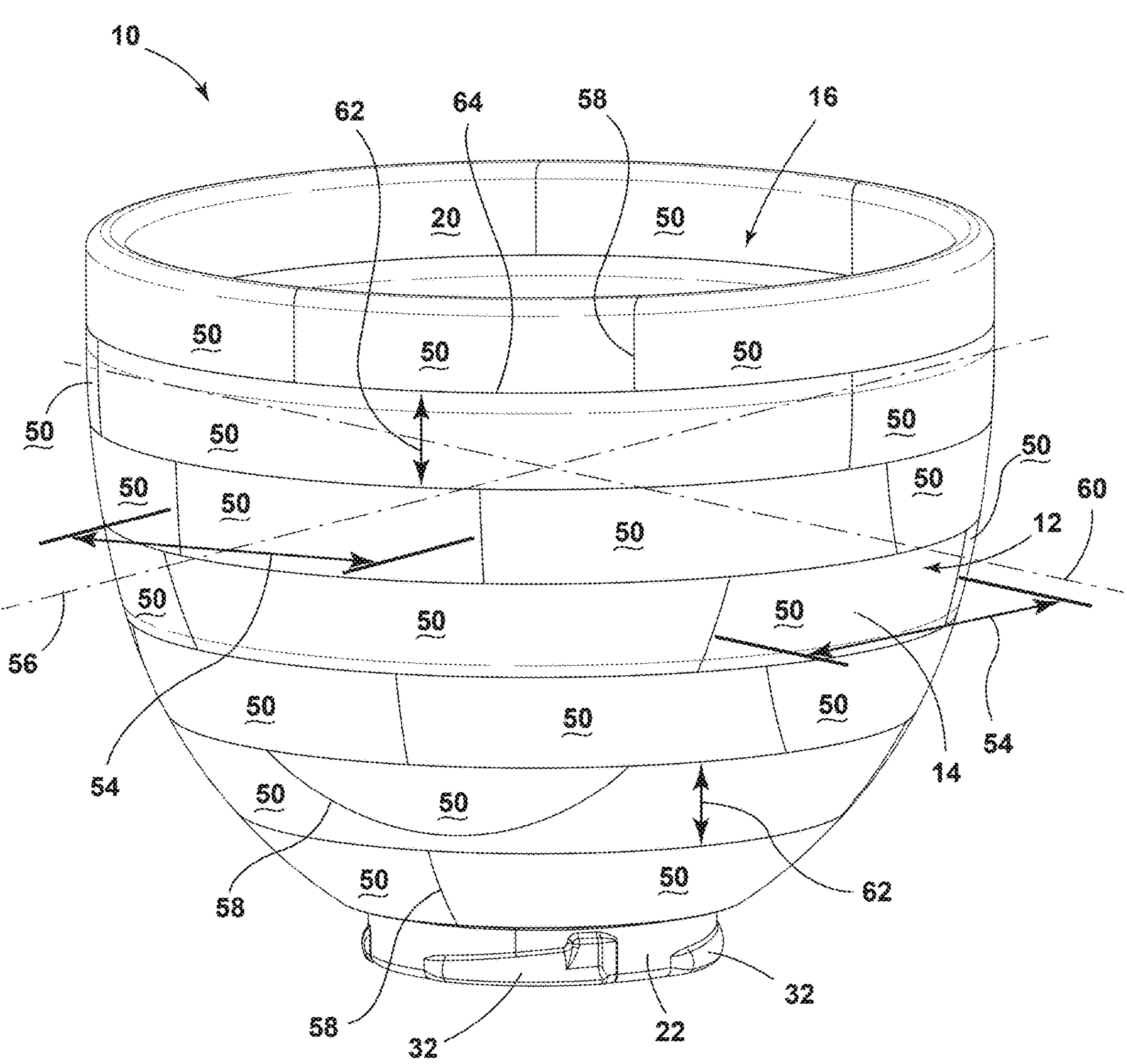
FIG. 2 is a perspective view of the wooden mixing bowl of FIG. 1 disassembled from the stand mixer.

As shown in FIGS. 1 and 2, the mixing bowl 10 can, in at least one aspect, include a mounting base 22 coupled with the bowl body 12 on the exterior 14 thereof and configured to couple the mixing bowl 10 with a retention feature M of a stand mixer S (FIG. 1). As can be appreciated, the depicted stand mixer S is merely exemplary and the mixing bowl 10 described herein may be adapted to work with different types of stand mixers. In general, the stand mixer S is generally configured as an electronic appliance used for mixing ingredients. According to a typical construction, the stand mixer S includes the retention feature in the form of a bowl mount M that is defined on a base B to anchor or otherwise removably retain a variety of mixing bowls. The stand mixer S includes an output O to which various mixing tools can be connected for use in connection with various ingredients and desired results or purposes. Stand mixer S is configured to drive such tools, including the depicted beater attachment A, in a planetary motion that involves rotating the mixing tool about a moving axis that rotates about a central fixed axis (that aligns with a center of the mixing bowl 10). This arrangement is used to develop more even incorporation of ingredients during mixing by re-incorporating the ingredients, for example. The mixing bowl 10 is removably coupled with the bowl mount by way of the above-mentioned mounting base 22 such that the beater attachment A, for example, can mix or otherwise process ingredients contained in the mixing bowl 10. As shown, the beater attachment A may be used, in one aspect, to prepare batters, frostings, and other viscous food products that are intended to be thicker in consistency than items processed using a whisk, for example, while not settling into a cohesive mass, as would a dough, for example (which may be processed using a separate element in the form of a hook, for example).

The present stand mixer S is what may be generally referred to as a "tilt-head" stand mixer, in which the mixing head H is rotatably fixed about an upper end of the base B by an extent sufficient to move the mixing tool (i.e., beater attachment A) upwardly out of the mixing bowl 10 such that the tool can be removed or the interior of the mixing bowl 10 can be accessed or removed (such as for addition of ingredients or removal of the mixed product). As shown in FIG. 1, the stand mixer S includes the above-mentioned mixing head H connected to base B, which supports the mixing head H above a work surface W. The mixing head H encloses a drive motor that is configured to drive planetary movement of the output O, as described above, as well as rotating a coupling within the attachment hub C. In one example, the drive motor can be a variable speed AC motor that can be controlled by a user via a sliding control knob accessible on the exterior of the mixing head H. In other examples, the drive motor can be a DC motor, including a brushless DC motor that can be controlled digitally using an adaptation of the control knob or using a digital interface.

Still referring to FIG. 2 the layers 52*a* and 52*b* of each of the first and second types can be configured such that each of the respective lamination segments 50 therein have a common height 62 in the direction of the height H of the bowl body 12 such that each of the layers 52*a* 52*b* has the same height 62 as the segments 50. In one example, the height 62 of each layer 52*a*, 52*b* can be approximately 1 inch (e.g., 1.00"+/−0.050"). The widths 54 of the lamination segments 50 can be between about 2.5 inches and 3.5 inches (e.g., +/−5%). More specifically, the segments 50 can be of the same width 54 within the given range, including the segments 50 in the first layer type 52*a* and the lamination segments 50 in the second layer type 52*b* being configured with a generally uniform width (e.g., +/−5%) throughout. Additionally, the layers 52*a* and 52*b* of the first and second types can be of the same height, such as within the range provided above, such that all of the lamination segments 50 have these same dimensions, despite the individual lamination segments 50 having otherwise different shapes or configurations, as discussed below. In this respect, the primary distinction between the noted "types" of layers 52*a* and 52*b* can be the direction 56 or 60 along which the widths 54 of the segments 50 extend and the corresponding direction of the joints 58 between the segments 50. As discussed above, these features are respectively oriented at 90° to each other between the first layer type 52*a* and the second layer type 52*b*.

All of the lamination segments 50 within both of the layer types 52*a* and 52*b* can be coupled together along the respective joints 58 using an adhesive. Various types of adhesives, including glues or the like, may be approved for indirect food contact and, accordingly would be suitable for use in coupling the lamination segments 50 along the respective joints 58. Additionally, the sequential ones of the alternating layers 52*a* and 52*b* can meet along an interface 64 and can similarly be coupled together there along using the same adhesive or glue as used in the joints 58. In one aspect, the dimensions of the segments 50 provided herein, as well as the orientation of the segments 50 between the layer types 52*a* and 52*b* and type of wood from which the segments 50 are formed may be interrelated such that the specific dimensions described herein may be suitable for minimizing separation of the segments 50 along the joints 58 and the interface 64 between successive layers 52*a* and 52*b*, as well as cracking of the segments 50, particularly along the end grain of the wood that is disposed along certain ones of the segments 50 by way of the width 54 of the particular segment 50 extending at least partially across the exposed exterior 19 or interior surfaces 20 of the bowl body 12. In a further aspect, such dimensions may be particularly suitable when the segments 50 are made from walnut wood (including with respect to the grain structure, grain type, harness, density, moisture content, etc. thereof), with other wood varieties of one or more similar relevant characteristics also being generally suitable for the dimensions and construction discussed herein.

Figures 3, 4:
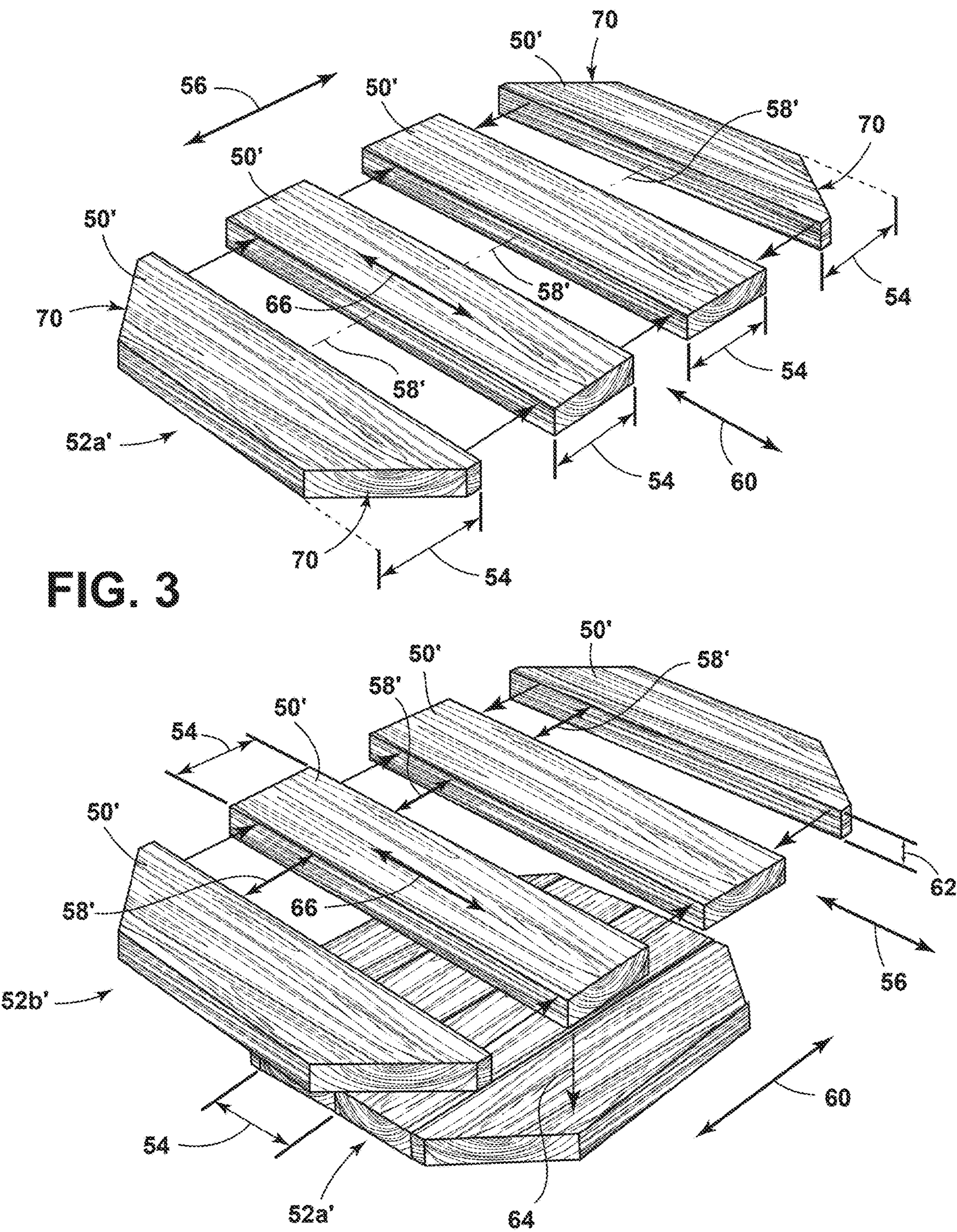
FIG. 3 is a perspective view showing a plurality of wood boards in an assembly state of the wooden mixing bowl.
FIG. 4 is a perspective view showing the plurality of wooden boards of FIG. 3 assembled into a lamination layer with an additional plurality of wooden boards shown in a position for additional assembly in a further assembly state of the wooden mixing bowl.

As shown in FIGS. 3-8, the lamination segments 50 can be shaped portions of laminated boards 50' having widths 54 corresponding with the respective widths 54 of the lamination segments 50. In this manner, the direction (e.g., the corresponding one of the first direction 56 and the second direction 60) along which the respective widths 54 of the lamination segments 50 extend can be across a grain direction 66 of the laminated boards. More particularly, the mixing bowl 10 can be fabricated in this manner by a method that includes assembling a plurality of wood boards 50' into a plurality of a plurality of lamination layers 52'. As mentioned, each of the wood boards 50' defines a width 54 across the grain structure of the board, which will exhibit a generally established grain direction 66. As shown in FIG. 3, a particularly quantity of boards 50' for a given layer, such as layer 52*a'* in FIG. 3, are selected based on the dimensions of the boards (i.e., width 54 and height 62 thereof) and the desired dimension of the bowl, including such that the resulting lamination layer 52*a'* is larger than the desired dimension for the mixing bowl 10 at the corresponding location along the height H of the mixing bowl 10. In a similar manner, the boards 50' may be cut to a length 68 along similar considerations. Additionally, some of the boards 50' may be cut with a chamfer 70 at one or both ends thereof to reduce material use and/or facilitate shaping of the resulting segment 50 (or the mixing bowl 10, overall).

As shown in FIG. 3, the appropriate number of boards 50' are coupled together at the respective joints 58' therebetween extending along respective lengths 68 of the wood boards 50'. The boards 50' may be subjected to processing (such as a planing or joining process using appropriate equipment) to ensure a consistent mating thereof along the joints 58'. As discussed above, the boards 50' can be joined together along the joints 58' using food safe wood glue or other, suitable adhesive, which may include aligning the wood boards, as shown in FIG. 3 along the joints 58' with a suitable amount of adhesive therebetween and physically maintaining contact along the joints 58' until the adhesive has dried or cured to an acceptable extent, which can be done using clamps or the like. As can be appreciated, the resulting lamination layers 52' each have a height 62 corresponding with a thickness 62 of the wood boards 50' (measured in a respective direction normal to the width 54 and length 68 thereof. After assembly of an acceptable number of lamination layers 52', given the desired height H of the mixing bowl 10 and the height 62 of the layers 52', the lamination layers 52' are joined together in a direction corresponding with the respective heights 62 of the lamination layers 52' (i.e., vertically, with reference to the direction shown in the figures) to form a blank 12' (FIG. 5).

As shown in FIG. 4, the lamination layers 52' are successively arranged in alternating first and second orientations corresponding with the resulting layer types 52*a* and 52*b* discussed above. More particularly, as shown in FIG. 4, the first lamination layer 52*a*' is considered as being positioned in a first orientation such that the respective lengths 68 of the wood boards 50' extend in the first direction 56. The second lamination layer 52*b*' is then positioned vertically above the first lamination layer 52*a*' in the second orientation, which is such that the respective lengths 68 of the wood boards 50' in that layer 52*b*' extend in the second direction 60, which as discussed above, is established as being perpendicular to the first direction. The second lamination layer 52*b*' is then joined to the first lamination layer 52*a*' along the resulting interface 64' therebetween. As discussed above, this joining can be done using the same adhesive that is applied between the joints 58' and can include subjecting the lamination layers 52*a*1, 52*b*', etc. to a plaining process to similarly ensure consistent mating along the interfaces 64. In this respect, it is noted that FIG. 4 shows the second lamination layer 52*b*' in a disassembled stated, but in one example, all of the lamination layers 52*a*' and 52*b*' can be assembled simultaneously before being assembled together for efficiency, as the only appreciable difference between the layers 52'*a* and 52*b*' may be the orientation thereof. Additionally, it is noted that the construction of the lamination layers 52*a*' and 52*b*' can be considered as generally establishing the first and second directions 56 and 60 by way of the construction of the boards 50' and the resulting widths 54 and lengths 68 thereof (e.g., the grain direction of the boards in the designated first layer 52*a*' corresponding with the second direction 60).

Figure 5:
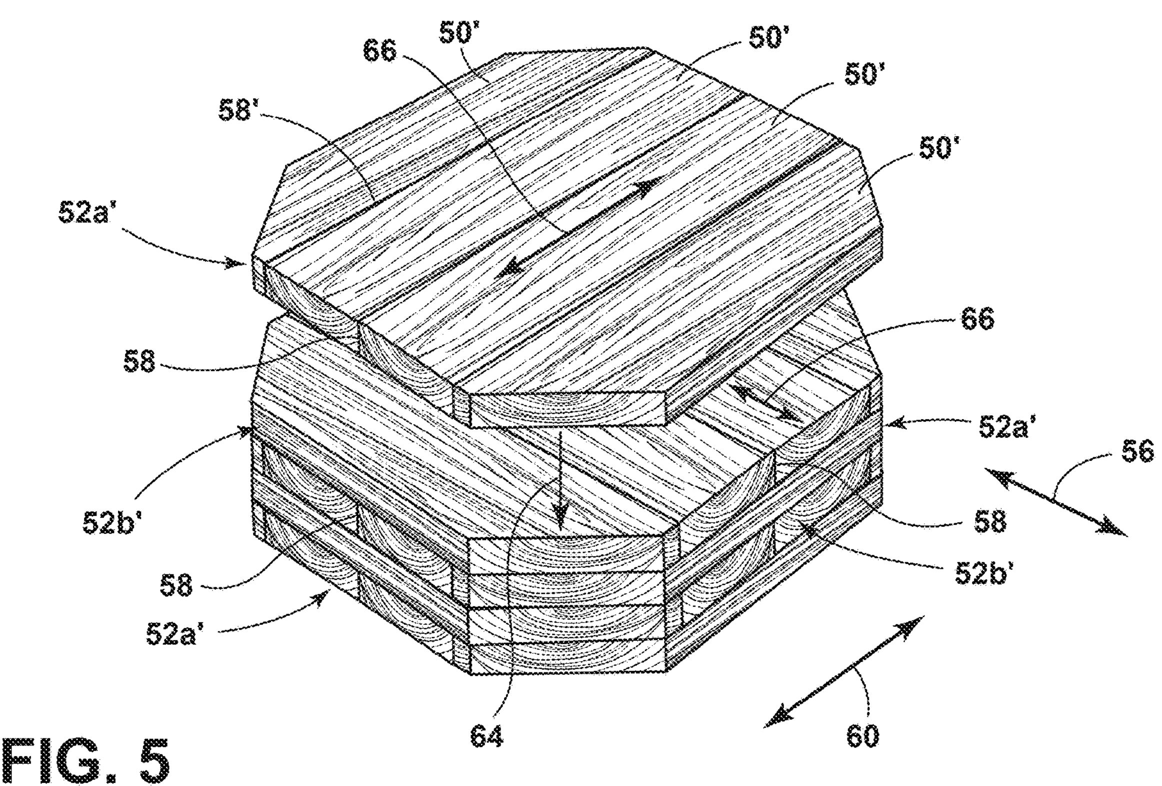
FIG. 5 is a perspective view of a plurality of lamination layers assembled into a blank in a further assembly state of the wooden mixing bowl.
Figure 6:
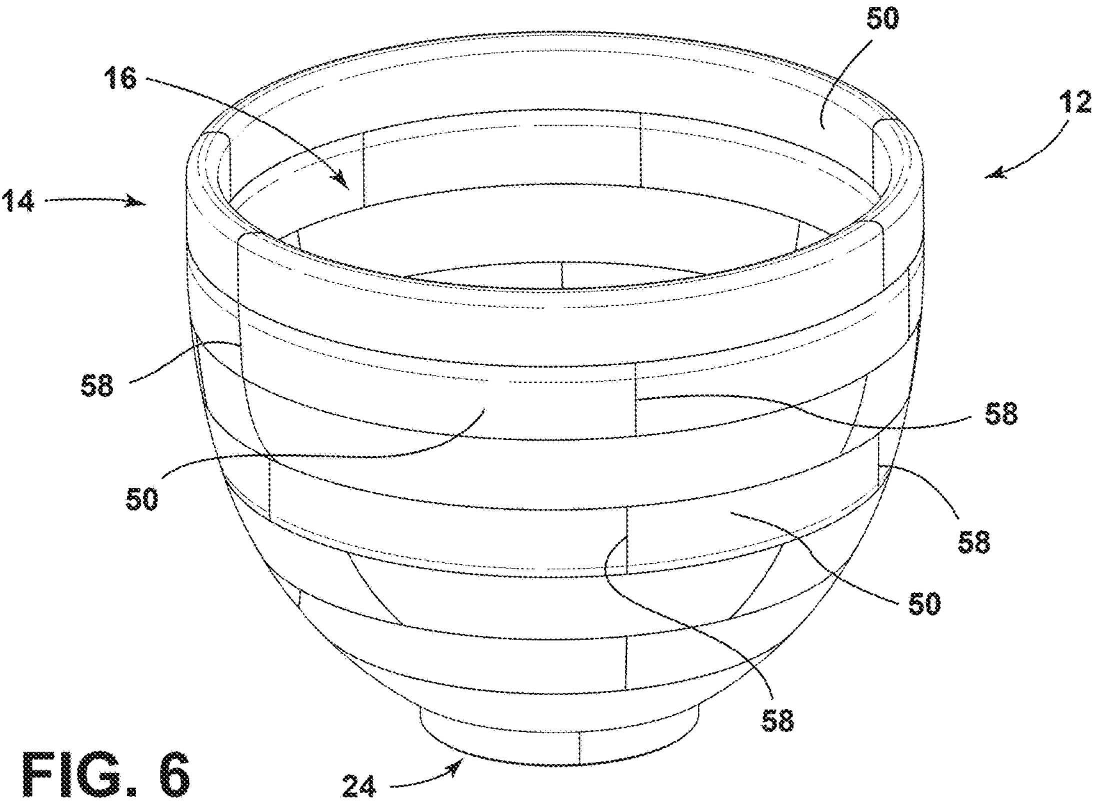
FIG. 6 is a perspective view of the blank of FIG. 5 shaped into a bowl body for the mixing bowl in a further assembly state thereof.
Figure 8:
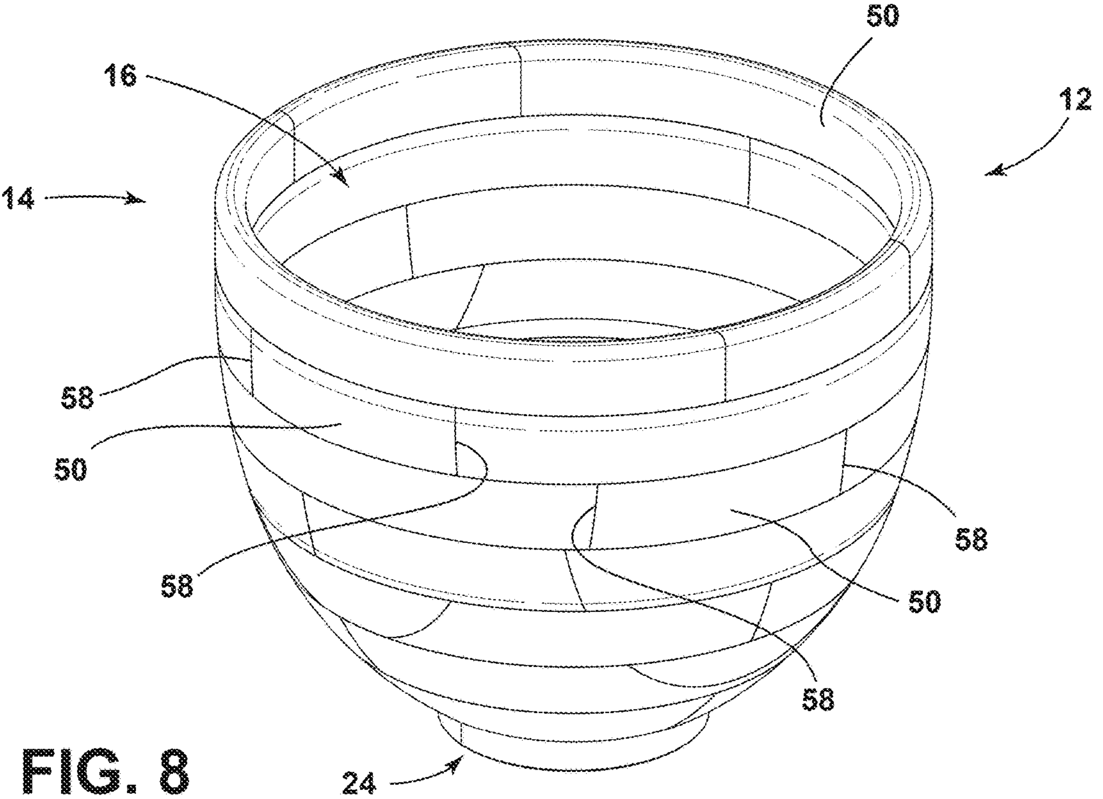
FIG. 8 is perspective view of the blank of FIG. 7 shaped into a bowl body for the mixing bowl in a further assembly state thereof.
Figures 9, 10:
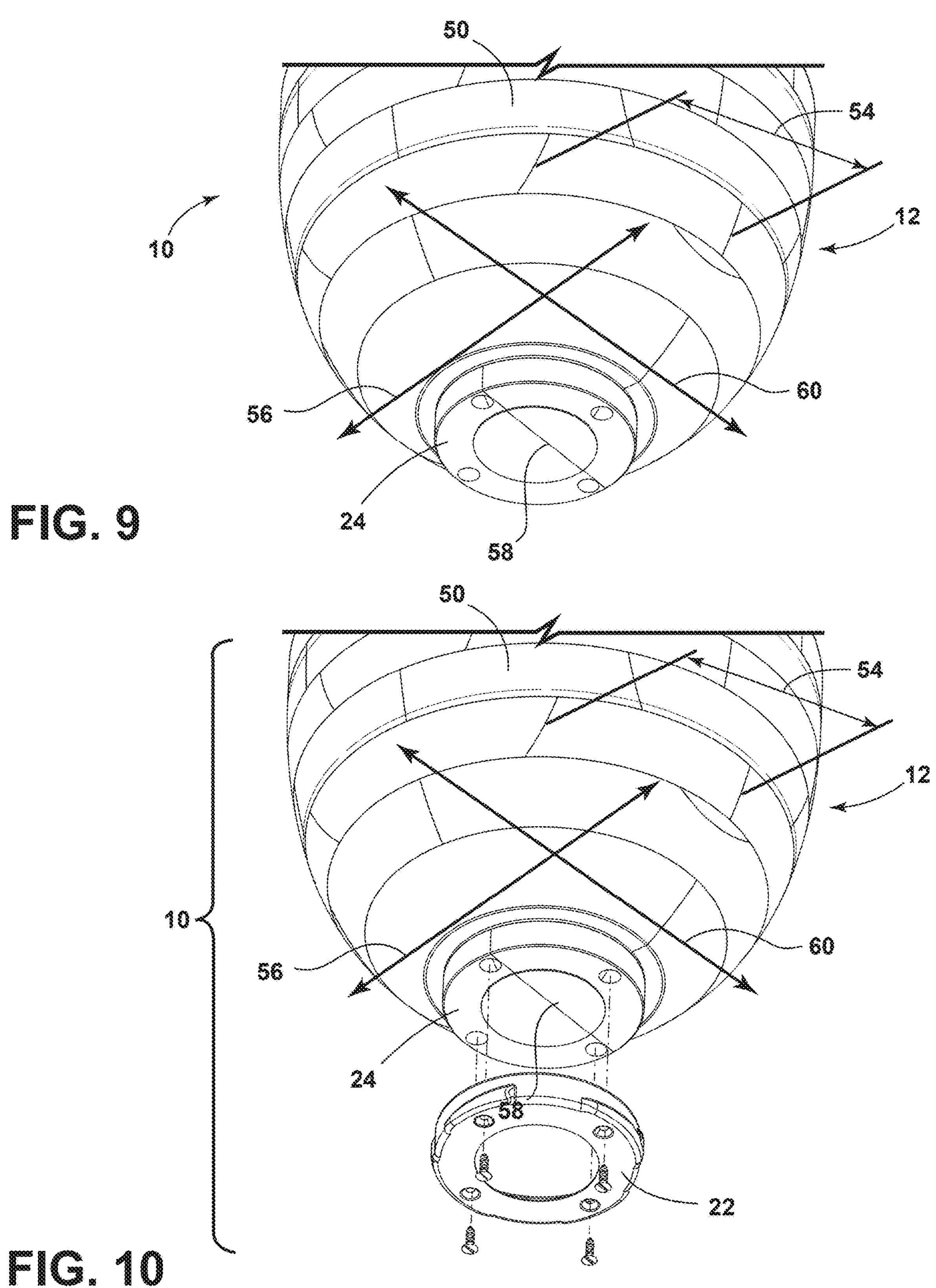
FIG. 9 is a bottom perspective view of the blank of FIG. 7 shaped into a bowl body for the mixing bowl.
FIG. 10 is a bottom perspective view of the bowl body of FIG. 9 shown in an assembly condition with a mounting base of the wooden mixing bowl.
Figure 11:
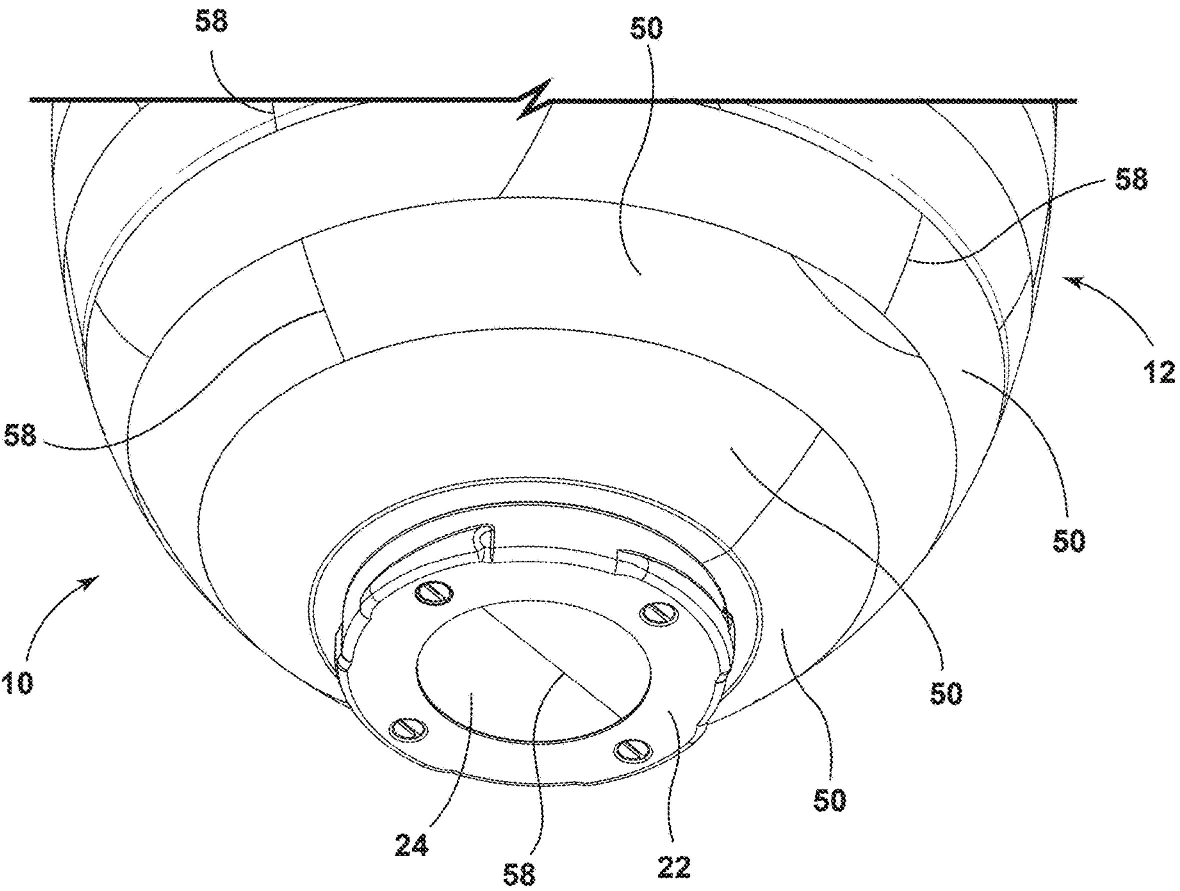
FIG. 11 is a bottom perspective view of the wooden mixing bowl with the bowl body and mounting base of FIG. 10 assembled together.
Figure 12:
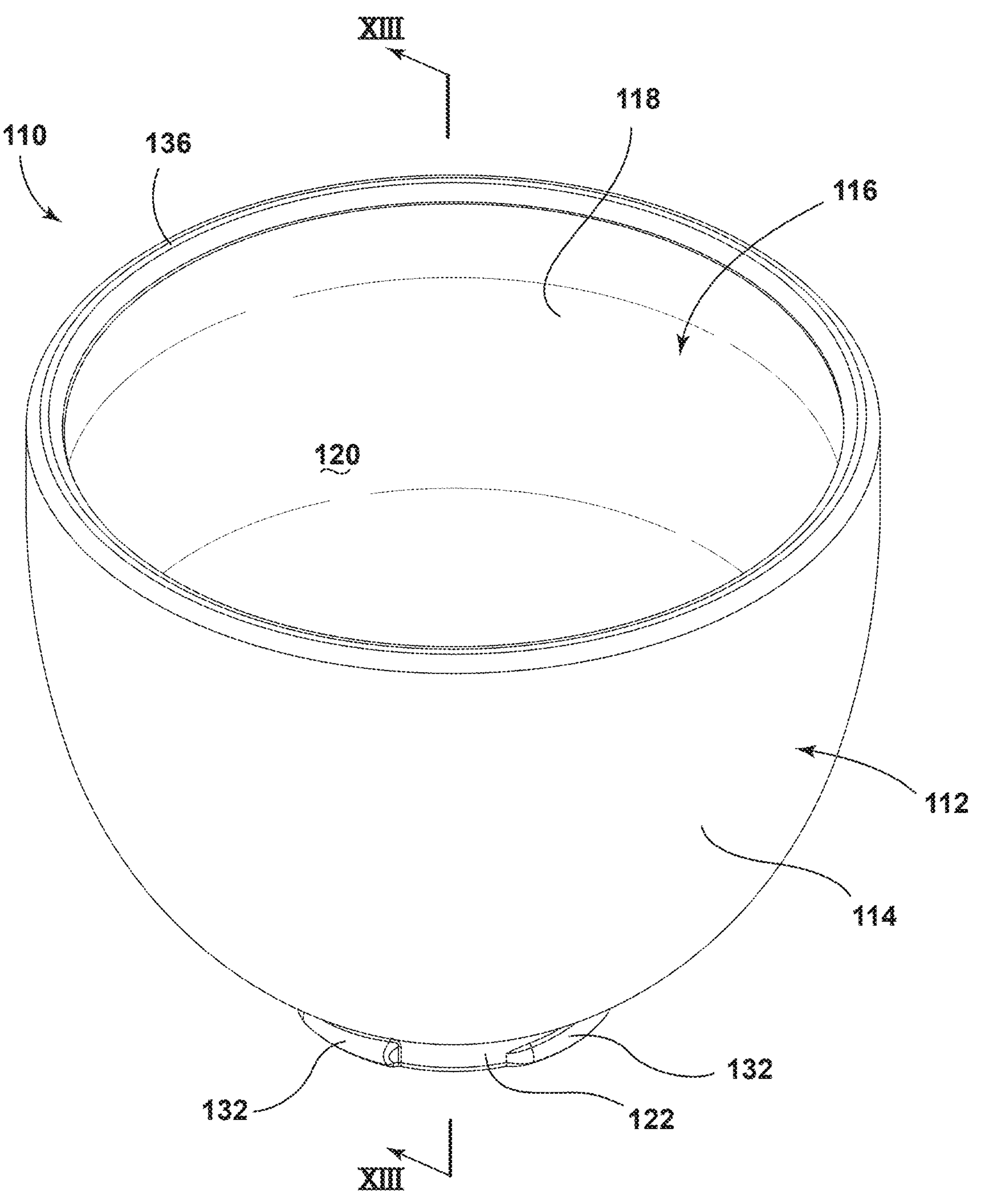
FIG. 12 is a perspective view of an alternative wooden mixing bowl according to a further aspect of the disclosure.

As shown in FIG. 5, the layers are alternatingly positioned such that they correspond with the described first layer 52*a*' and second layer 52*b*' in their orientation. More particularly, each successive layer 52*a*' or 52*b*' is oriented with the joints 58' (and the lengths 68 of the boards 50') extending perpendicular (with acceptable tolerancing, such as +/−) 1° to the layer 52*b*' or 52*a*' immediately below it. As can be appreciated, this successively alternating orientation arrangement results in the alternating layer types 52*a* and 52*b* of the resulting mixing bowl 10. Once an acceptable number of assembled lamination layers 52*a* and 52*b* are stacked together, the resulting blank 12' can be clamped, or weighted to maintain a tight and/or slightly compressed relationship among the interfaces 64' until the adhesive has acceptably dried or cured. As shown in FIG. 6, once the blank 12' is assembled to the desired dimensions, the blank 12' can be shaped into the desired form of the bowl body 12, as shown in FIG. 8, including the desired shape of the exterior 14 and the interior cavity 16. The shaping can also include the formation of a base portion 24 (FIG. 9) to which the mounting base 30 is affixed, as shown in FIGS. 10 and 11.

As can be appreciated, shaping the blank 12' into the bowl body 12 results in the wood boards 50' being respectively reconfigured as the lamination segments 50 described above and shown in FIGS. 2 and 6. In this manner, the lamination segments 50 can be characterized as shaped portions of the respective boards 50' having widths 54 corresponding with the respective widths 54 of the resulting lamination segments 50, as measured in the respective first 56 and second 60 directions, as established by the orientation of the wood boards 50' in the lamination layers 52*a*' and 52*b*', as discussed above. In this manner, the relevant orientation may be evidenced in the bowl body 12 at least by an assessment of the direction of the joints 58 between segments in a given layer type 52*a* or 52*b*, as this direction (which may be assessed by comparing the location of such joint 58 between the exterior 14 and interior cavity 16) will remain consistent after formation. As discussed above, the widths 54 of the lamination segments 50 will extending across the grain direction 66 of the wood boards 50' and the resulting segments 50 such that portions of the end grain 72 are exposed on the exterior 14 and interior 16 of the bowl body 12. In this manner, and consistent with the above discussion, the height 62 of each of the lamination layers 52*a*' and 52*b*' can be approximately 1 inch resulting in the segments 50 having the same height 62 after shaping of the bowl body 12. Similarly, the widths 54 of the wood boards 50' can be between 2.5 inches and 3.5 inches and can result in the segment 50 having the same width 54 after shaping. As can be appreciated, various ones of the boards 50' used to ultimately assembly the blank 12' can be shaped into multiple ones of the segments 50 such that certain ones of the segments 50 may be from the same board 50'.

As shown in FIG. 2, the resulting mixing bowl 10 can be configured with the bowl body 12 having a wall thickness T of about ½ inch, or in a more specific example, 0.47 inches, or in a further specific example, 0.472 inches (given acceptable tolerancing corresponding with such dimensioning). The overall height H of the mixing bowl 10 can be about 7.5" (+/−0.01") with an outer diameter D of about 9.4" and an inner diameter of about 8.4". It is to be appreciated that the method described herein can be used to fabricate different types of bowls with varying configurations and/or varying dimensions to those shown and described herein.

Figure 7:
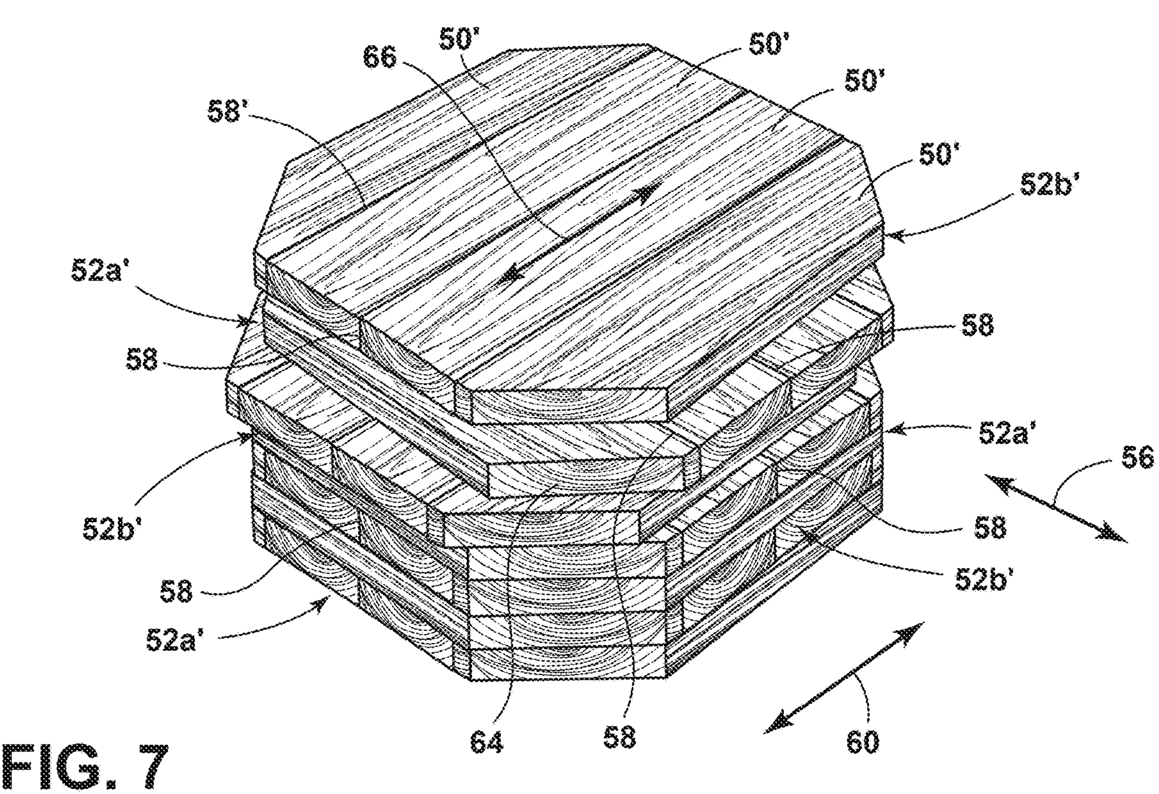
FIG. 7 is a perspective view of an alternative blank with offset lamination layers.

The step of shaping the blank 12' into the bowl body 12 can be carried out by selectively removing material from the blank 12' using a mechanical process. Such a process can be carried out using a lathe, a mill, or the like, and may be finished using a sanding process. Any of these processes can be carried out using a manually-controlled machine or an automated machine (i.e., a CNC lathe or a CNC mill) or various combinations thereof. As shown in FIG. 6 the shaping of the bowl body 12 in particular dimensions relative to the above-described dimensions of the wood boards 50' may result in certain ones of the joints 58 aligning vertically between successive layers 52*a* and 52*b* or being within a predetermined range (e.g., 1 cm) of vertical alignment that may not be desired. An example of this alignment is shown at joints indicated as 58*a* in FIG. 6 but may be present in other areas in other configurations of the lamination layers 52' and/or bowl body 12. To eliminate this condition, various ones of the layers $52a_o$' and $52b_o$' (i.e., layers corresponding with the aligned joints 58*a*) can be offset from the position of the next successive layer 52*a*' or 52*b*' having the same orientation (or from a "centered" position established, for example, by the lowermost layer 52*a*'). In this respect, the offset direction corresponds with the direction of the width 54 of the wood boards 50' in the given layer 52*a*' (i.e., laterally perpendicular to the grain direction 66). The degree to which the subject lamination layers 52*a*' or 52*b*' are offset can vary depending on the positioning of the relevant joints 58*a* and the other affected joints 58 such that the offset removes the relevant aligned condition without introducing other aligned conditions in other affected joints 58. As shown in FIG. 7, lamination layers $52a_o$' in one orientation are joined respectively above and below another lamination layer $52b_o$' that is the other orientation (i.e., perpendicular to layers $52a_o$') with the lamination layers $52a_o$' being offset relative to each other. In the illustrated example, both layers $52a_o$' are both offset relative to the other lamination layer 52*a*' in the same orientation, but in some examples only one of the lamination layers $52a_o$' may be offset in this manner, similar to the intermediate layer $52b_o$'. As can be seen, this offsetting results (and may be evidenced by) the joints 58' between the boards 50' (and the joints 58 between segments 50) in the lower lamination layer $58a_o$' being offset from the boards in the other comparative lamination layer $52a_o$' in the relevant direction 60. The effect of this offsetting on the resulting bowl body 12 is shown in FIG. 8.

In either example, after the bowl body 12 is shaped, it can be coated with a polymeric material to help seal the bowl body 12 from liquid intrusion and/or to increase the durability of the resulting mixing bowl 10. In various aspects, the coating can be of a polymeric material and can be one designated as safe for food contact. In one example, such a coating can be of polyurethane, which can be applied by spraying, painting, dipping or the like. The coating can be applied over the entire bowl body 12 or, some examples, only within the interior cavity 16 or on the entire bowl body 12, except along portions of the base portion 24 not covered by the mounting base 22.

Referring to FIGS. 12-15, where similar features to those discussed above are referred to with similar numbers increased by 100, reference numeral 110 generally designates a mixing bowl for a stand mixer S (as shown in FIG. 2) according to another aspect of the disclosure. The mixing bowl 110 includes an outer body 112 consisting essentially of wood and defining an exterior 114 and an interior cavity 116. The mixing bowl 110 also includes a liner 118 consisting essentially of metal and coupled within the interior cavity 116 of the outer body 112 so as to define an interior surface 120 of the mixing bowl 110. A mounting base 122 is coupled with the outer body 112 on the exterior 114 thereof and is configured to couple the mixing bowl 110 with a retention feature of the stand mixer S.

The interaction of the various types of tools that can be used in connection with the stand mixer S to process ingredients within the mixing bowl 110 can subject the interior surface 120 thereof to repeated impacts and scraping from the utilized mixing tool. While certain implementations of the beater attachment A shown herein may have rubber "flex edges", other implementations thereof, as well as other tools such as whisks, and dough hooks can be of metal. Whisks, in particular may be configured to make intentional, periodic contact with the interior surface 120 of the mixing bowl. When such tools are used in connection with a wooden mixing bowl, the periodic contact of metal tools with the interior, as well as frequent interior cleaning may lead to undesirable wear to the interior surface thereof. Accordingly, the present mixing bowl incorporates the above-mentioned metal liner 118 to provide a durable interior surface 120 for the mixing bowl 110, which includes outer body 112 of wood, which may be preferred by some consumers for aesthetic purposes, as well as for weight savings and environmental concerns. In this manner, the interior surface 120 defined on the metal liner 118 can offer improved durability over wooden bowls with no such liners, as well as some plastic bowls.

In at least one implementation of the mixing bowl 110, generally described above, the outer body 112 can define a first material thickness T1 of between 10 mm and about 15 mm (all dimensions=/−10%, for example) along a portion of the outer body 112 with which the liner 118 is coupled (or in areas over which the liner 118 is positioned, for example). The liner 118 can define a second material thickness T2 of between 2 mm and 3 mm, for example. In this respect, it is noted that the thicknesses T1 and T2 listed herein may vary by the particular type or species of wood used for the outer body 112 and the type of metal of the liner 118. In various examples, the outer body 112 can be fabricated from various types of hardwoods including, but not limited to, walnut, olive, teak, mahogany, oak, ash, birch, or the like. In this manner, the outer body 112 can be formed from a blank of the desired type of wood by various woodworking processes, including but not limited to wood turning (i.e., using a lathe, which may be computer controlled and may involve separate processes and/or machinery for shaping the exterior 114 and interior cavity 116), CNC milling, or the like. In connection with such processes, the blank can comprise multiple pieces of the selected wood joined together, for example by gluing or the like, in an arrangement selected according to the wood species (for example, the hardness, strength, grain profile, etc. thereof) and forming process, one example of which is discussed further below. The thickness T1 of the outer body 112 can, accordingly vary based on the selection of any or all of these features or processes (species, blank composition, fabrication), as well as the general geometry of the mixing bowl 110. In this manner, the thickness T1 may not be consistent throughout the entire profile of the outer body 112, but may vary to provide additional strength or material, in general, in certain areas of the outer body 112, as discussed in some examples below. Once fabricated, at least the exterior 114 (e.g., any portions of the outer body 112 not covered by the liner 118) can be sanded and finished using an acceptable coating material, such as various food-grade polyurethanes, natural waxes, oils or the like.

In a similar manner, the thickness T2 of the liner 118 can vary depending on the selected metal, which may be aluminum, copper, stainless steel, or the like, as well as the fabrication process. In various examples, the liner 118 can be formed using a metal spinning process, a deep-drawing process, or the like. Notably, some harder metals, such as stainless steel, may accommodate a thinner profile than relatively softer, or more malleable, material, such as copper or the like. Similarly, some processes may require a thicker material or may result in a thinner overall profile at varying degrees of uniformity. In various implementations of the present mixing bowl 110, the liner 118 can be coupled with the outer body by an adhesive layer 125 at least partially disposed between the liner 118 and the underlying portions of the outer body 112. The location and quantity of the adhesive can vary depending on the type of adhesive used. In some applications, the entire outer surface 127 of the liner 118 can be coated with the adhesive 125 (it being understood that the adhesive 125 can be applied to the corresponding portion(s) of the outer body 112). In other examples, the adhesive layer 125 can include multiple portions applied, for example, in a ring adjacent the upper end of the liner 118 and toward the bottom thereof and/or in vertical strips extending along the height of the liner 118 in, for example, 45°, 30°, or 20° intervals. In general, certain adhesives designated as useable in food-related applications can be used (although the adhesive layer 125 is not presently contemplated as being in a location where contact with the actual food product would be made. Such adhesives may exhibit good workability, low viscosity, and high molecular weight and may include certain pressure-sensitive adhesives, laminating adhesives (including acrylic and urethane adhesives, which may be cross-linked with aliphatic poly-isocyanates), hot melt adhesives. The adhesive compositions used across these types of applications may include, polyurethane (which exhibits high bonding strength and flexibility), solution adhesives, which in some applications may be water-based and/or may include natural polymers that may contain a starch (e.g., dextrin or casein) or certain resins.

In one example, a base portion 124 of the outer body 112 can have additional material thickness over the thickness T1, which generally corresponds with a wall portion 126 of the outer body 112. In at least one aspect, the additional material can correspond with a raised central area 128 of the interior cavity 116 that reflects the tool movement within the mixing bowl 110 due to the planetary movement of the output O of the stand mixer S. Notably, the liner 118 can be shaped such that the interior surface 120 reflects the shape of the central area 128 of the interior cavity generally established by the outer body 112 (including without a substantial change in the liner 118 thickness T2 in such area). Additionally, the base portion 124 may extend downwardly to a generally flat base 30 that can define or receive the above-mentioned mounting base 122. In various aspects, the mounting base 122 can be configured to engage with a particular bowl mount M, which may be consistent for a specific manufacturer or brand of the stand mixer S, for example. In some variations, the bowl mount M may be configured as a shallow, bayonet-style, or twist-lock mechanism, with lugs or flanges that engage with angled flanges 132 on the mounting base 122 by twisting the mixing bowl 110 when received in the bowl mount M (e.g., clockwise to secure and anti-clockwise to release). In such an implementation, the angled flanges 132 can be formed directly in the wood material of the outer body 112 (such as by CNC milling or the like) or, for improved strength or durability, can be formed on a metal base unit 134 that can generally define the mounting base 122 when couple don the base portion 124 of the outer body 112, as shown for example in FIG. 13. In the illustrated example, the base unit 134 can be generally cup-shaped so as to receive the base portion 124 of the outer body 112 therein and can define a circular outer profile sized to fit in the example bowl mount M and including the above-described plurality of angled flanges 132 extending outwardly therefrom. Variations of this arrangement can be made so as to be inter-operable with other configurations of bowl mounts. Further, a mixing bowl 110 including a wooden outer body 112 and a metal liner 118 according to the disclosure herein can be adapted to work with a bowl-lift type stand mixer, as is known in the art.

Figure 13:
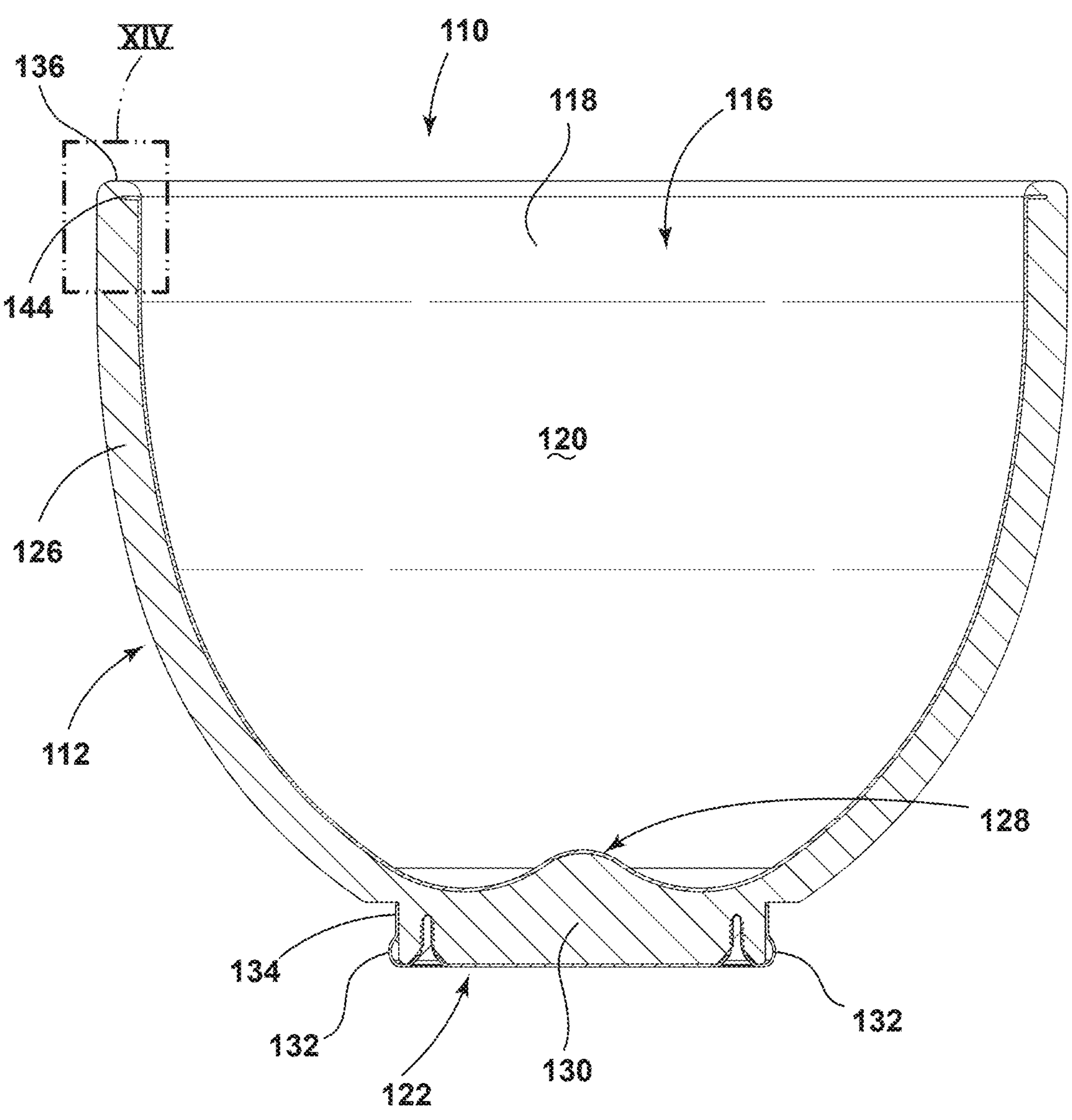
FIG. 13 is a cross sectional view of the wooden mixing bowl of FIG. 12.
Figure 14:
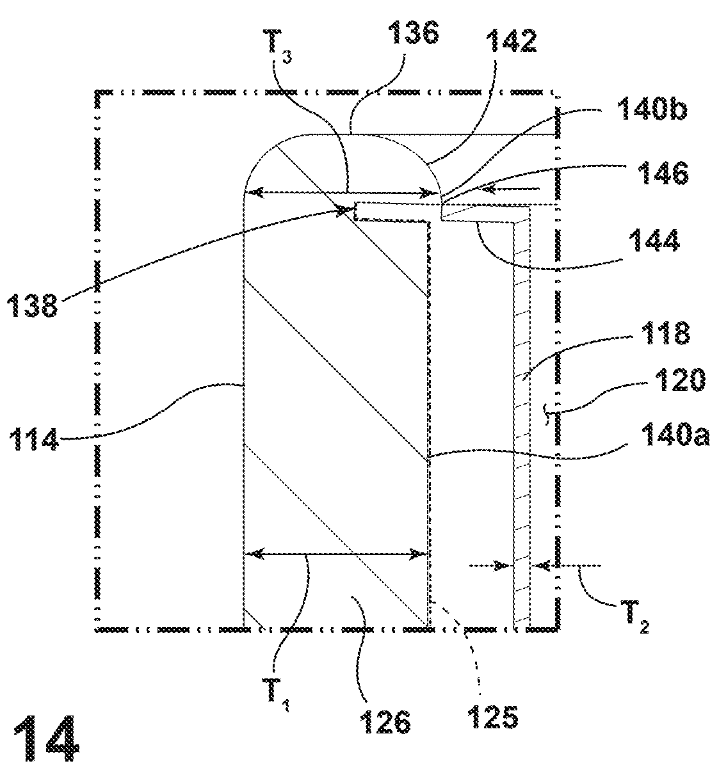
FIG. 14 is a cross sectional detail view of the wooden mixing bowl of FIG. 12 in an assembly state with a metal liner thereof.
Figure 15:
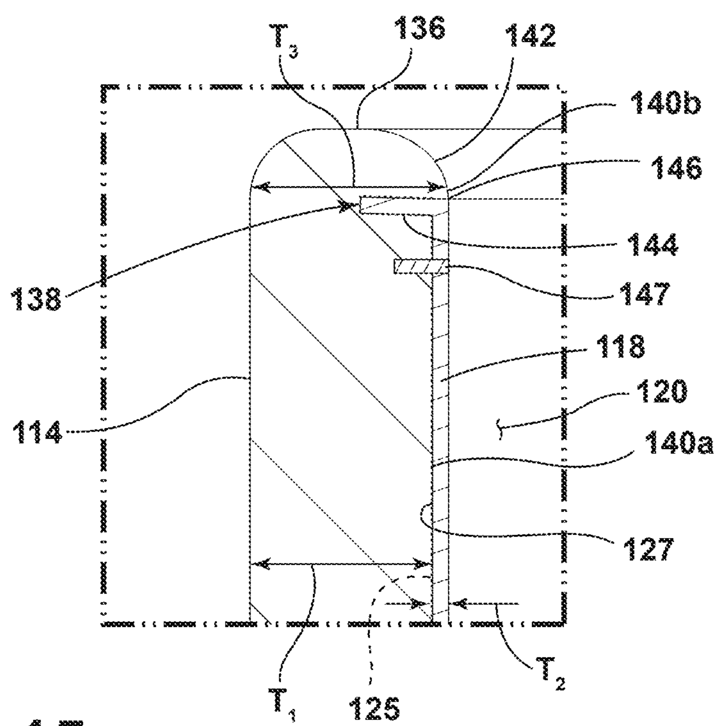
FIG. 15 is a cross sectional detail view of the wooden mixing bowl of FIG. 12 in an assembled state with a metal liner thereof according to an aspect of the disclosure.

As shown in detail in FIGS. 14 and 15, the outer body 112 can define an upper edge 136 that extends between the exterior 114 and the interior cavity 116. As shown, the upper edge 136 may have a semi-circular profile so as to smoothly join with each of the exterior 114 and the interior cavity 116 on opposite ends thereof. In the illustrated example, the outer body 112 also includes a groove 138 that extends inwardly from an interior wall 410 that defines the interior cavity 116. As shown, the groove 138 can be positioned adjacent the upper edge, such as within 5 mm of a transition point 142 between the upper edge 136 and an upper portion 140*a* of the interior wall 140. In some variations, it is noted that the groove 138 may be positioned immediately adjacent the transition point 142 (or the end of the upper edge 136) such that no discernable portion of an upper portion 140*a* of the interior wall 140 is present. In either variation, the liner 118 can include an upper flange 144 received in the groove. This arrangement can help retain the liner 118 within the interior cavity 116 and can provide for improved sealing of the upper edge 145 of the liner 118 with the outer body 112, by embedding a portion of the liner 118 beyond the upper edge 145 (i.e., the upper flange 144) within the outer body 112. As shown in FIG. 13, the outer body 112, which as described above, defines the first material thickness T1 along the interior wall 140 within the portion adjacent the groove 38 and over which the liner 118 is positioned. The outer body 112 can further define an additional material thickness T3 on the side of the outer body 112 opposite the groove 38. In the illustrated example, the material thickness T3 can be defined between the upper edge 36 and the groove 138, including at a junction 146 between the groove 138 and one of the interior wall 140 and the upper edge 136. As shown, the material thickness T3 above the groove 138 can be greater than the thickness T1 below the groove 138 such that the junction 146 is generally flush with the interior surface 120 of the mixing bowl 110, as defined by the liner 118. In addition to the fit of the upper flange 144 within the groove 38, one or more fasteners 147 (FIG. 15) assembled between the liner 118 and a portion of the outer body 112 adjacent the upper flange 144 and the groove 138. The fastener 147 or fasteners can be small nails, rivets, staples or the like and can be positioned at regular intervals along the circumference of the liner 118.

In general, a method for making the mixing bowl 110 described herein, can include coupling the metal liner 118, as described above, within the interior cavity 116 of the wood outer body 112 so as to define the interior surface 120 of the mixing bowl 110. The outer body 112 can be fabricated from wood to define the exterior 114 and the interior cavity 116, according to the various processes described above). The method further includes coupling the mounting base 122 with the outer body 112 on the exterior 114 thereof. As discussed further above, the mounting base 122 is configured to couple the mixing bowl 110 with a retention feature (e.g., the bowl mount B) of stand mixer M. In various aspects, the description of the mounting base 122 with the outer body 112 can include directly forming the mounting base 122 with the outer body 112 according to the variation discussed above.

The particular variation of the mixing bowl 110 shown in FIG. 13 can be fabricated, in one aspect, by forming the outer body 112, as discussed above. In an additional step, the groove 138 can be cut or milled into the desired location, as discussed above, to receive the upper flange 144 of the liner 118. In one aspect, the wall portion 126 of the mixing bowl 110 below the desired location of the groove 138 can be processed to achieve the desired thickness T1 before or after the groove 138 is formed in the outer body 112. Once the groove 38 is formed, the outer body 112 can be finished and the adhesive layer 125 applied within the interior cavity 116, according to any of the variations described above, and optionally including the application of some adhesive within the groove 38. The liner 118 can then be pressed into place such that the liner 118 deflects inward to allow the upper flange 144 to move inward (FIG. 14) to essentially snap into place within the groove 138 (FIG. 15). In various aspects, the geometry of the outer body 112 (including the shape of the upper edge 136 and the location and depth of the groove 138, as well as the width of the flange 144 can be configured to allow for assembly in this manner without resulting in plastic deformation of the liner 118. One or more of the above describe fasteners 147 can then be assembled between the liner 118 and the outer body 112. In some variations, fasteners 147 can be used in implementations of the mixing bowl 110 and related methods that do not include adhesive 125.

Figure 16:
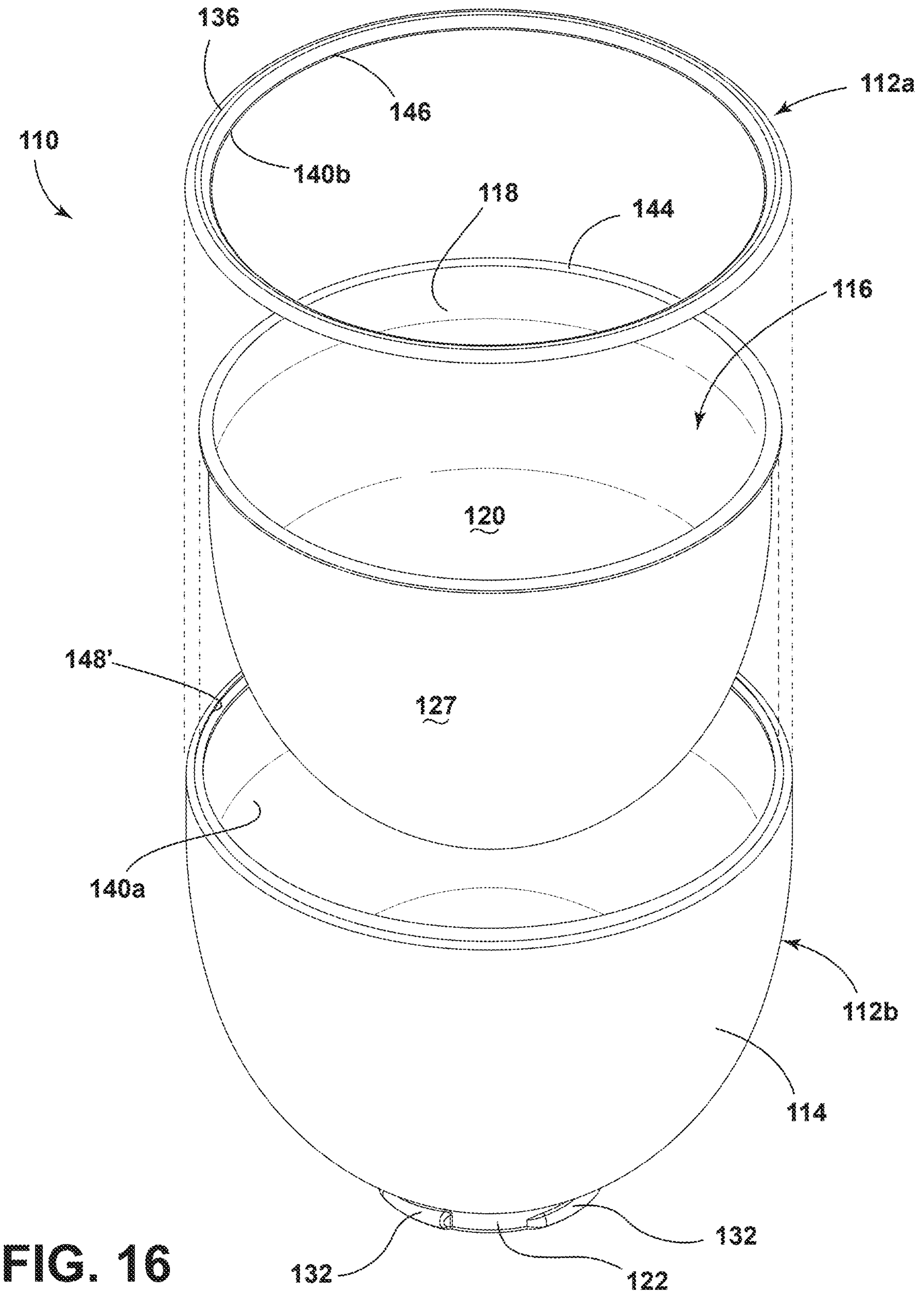
FIG. 16 is a perspective assembly view of the wooden mixing bowl of FIG. 12 according to an alternative aspect of the disclosure.

In another variation, shown in FIG. 16, the outer body 112 may comprise a lower portion 112*a* and an upper portion 112*b* joined with the lower portion at an interface 148. In this arrangement, the lower portion 112*a* and the upper portion 112*b* may collectively define the groove 138 in a way such that the groove 138 extends from, or is otherwise contiguous with, the interface 148. In this arrangement, the groove 138 can be initially formed as an open ridge 138' in the lower portion 112*a*, as shown in FIG. 16. In other variations, the groove 138 can be similarly initially formed in the upper portion 112*b* or can be formed by shallower ridges in each of the lower portion 112*a* and the upper portion 112*b*. As shown, in this fabrication process, the lower 112*b* and upper 112*a* portions of the outer body 112 can be formed as generally described above. The liner 118 can then be assembled with the lower portion 112*b* of the outer body 112 (including with adhesive 125 applied therebetween). The upper portion 112*a* can then be glued along the interface 148 to couple the upper portion 112*a* with the lower portion 112*b* to define the groove 138 within which the upper flange 144 is captured) and to provide the upper edge 36 to the outer body 112. The outer bowl can be sanded or otherwise smoothed along the interface 148 at the exterior 114 to provide a generally seamless appearance for the resulting outer body 112, which can then be subjected to a finish process, as described above, or a final stage of such a finish process (with the interior surface 120 being appropriately masked. As discussed above, the outer body 112 may include multiple layers of wood material, including within the lower portion 112*a*, with the upper portion 112*a* forming or otherwise appearing as one of such layers.

Figure 17:
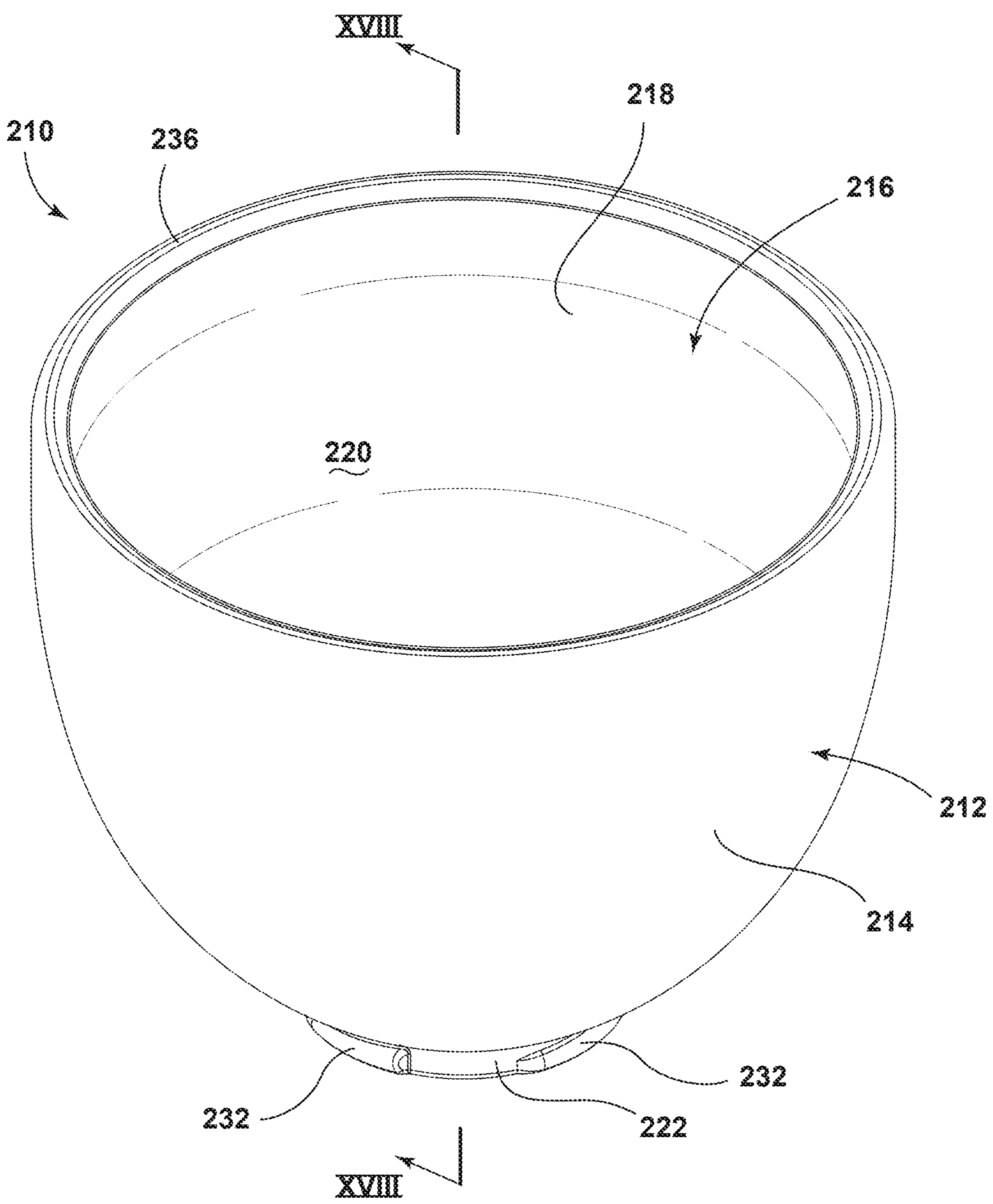
FIG. 17 is a perspective view of an alternative wooden mixing bowl according to a further aspect of the disclosure.
Figure 18:
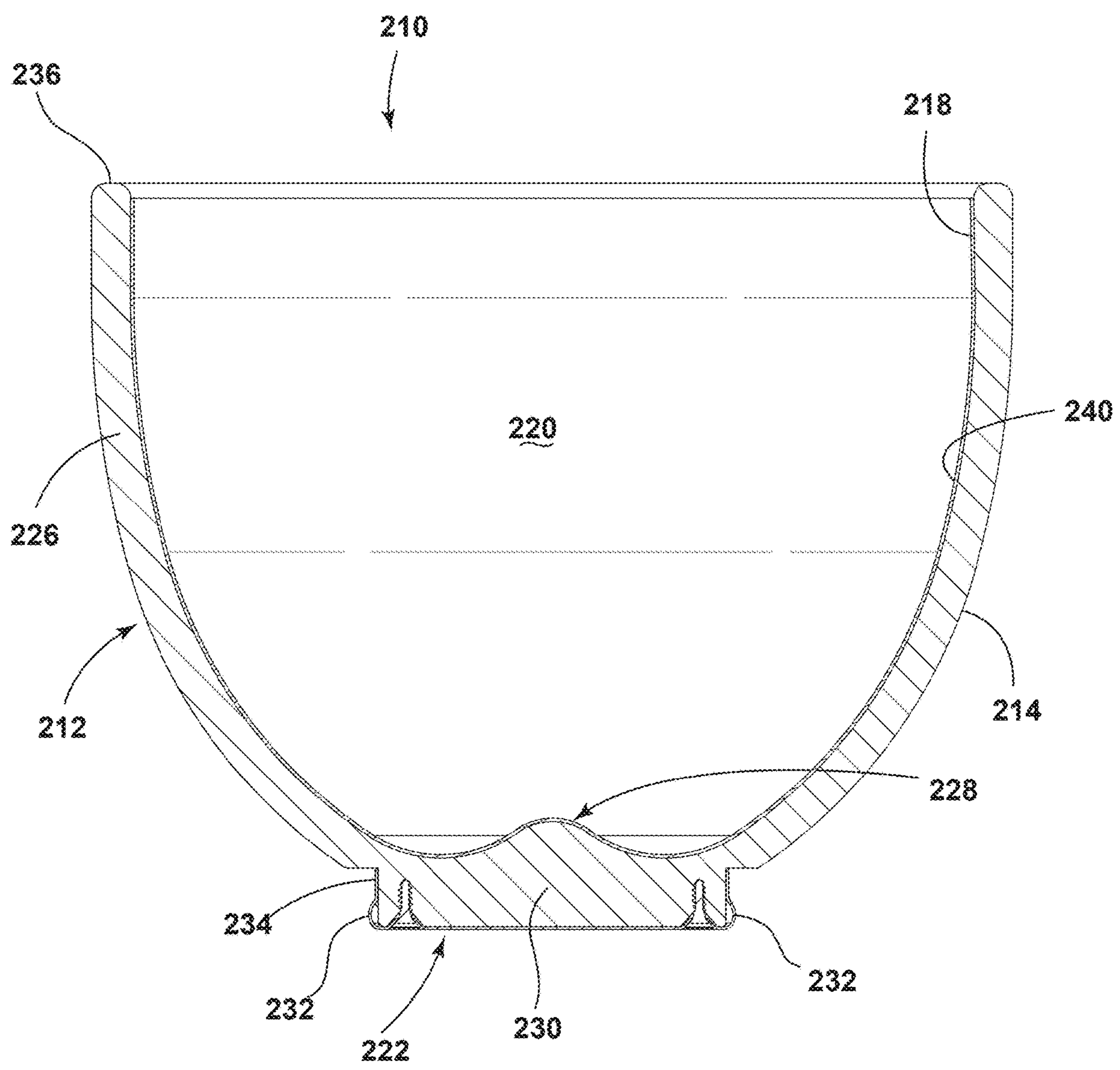
FIG. 18 is a cross sectional view of the wooden mixing bowl of FIG. 17.

In another variation, shown in FIGS. 17 and 18, where similar features to those discussed above with respect to FIGS. 1-11 are referred to with similar numbers increased by 200, the liner can be defined as a metal plating layer 218 within the interior cavity 216 of the outer body 212. In such a variation, the metal plating layer 218 can be formed directly on the outer body 212 within the interior cavity 216 (or otherwise as desired, of the desired material and to the desired thickness using generally known plating processes, which may include electroplating, electroless plating (using Nickel, for example), or the like. In some examples, a similar layer, still generally referred to as a plating layer 218 can be formed by other processes for depositing generally thin metal layers, including, but not limited to, chemical vapor deposition or the like. The outer body 212 used in connection with the plating layer 218 can be similar to that shown in FIG. 13, such that a greater material thickness is observable above the plating layer 218 for a generally smooth transition, but without a groove. In another variation, shown in FIGS. 17 and 18, the outer body 212 can have a generally consistent thickness T1 through the wall portion 226. In either variation, the plating layer 218 is generally consistently adhered and, to some extent, integrated with outer grain structure of the wood of the outer body 212 for desired levels of adhesion and fluid resistance.

When plating layer 218 is formed with an electroplating process, it may be desired to apply a thin metallic layer 250 to the interior surface 220, which may be applied as a metallic paint or the like. This may be beneficial in creating an electrode base for plating onto the layer 250 and, accordingly onto the outer body 212. By any such process, after the plating layer 218 is formed, it can be polished or finished using other processes, such as brushing, or the like.

The invention disclosed herein is further summarized in the following paragraphs and is further characterized by combinations of any and all of the various aspects described therein.

According to another aspect of the present disclosure, a mixing bowl includes a bowl body defining an exterior and an interior cavity and comprising a plurality of lamination segments. The lamination segments consist essentially of wood and are arranged in alternating layers of first and second types along a height of the bowl body with the layers of the first type including respective ones of the lamination segments having widths extending in a first lateral direction with respect to the bowl body and coupled together along joints extending in a second lateral direction with respect to the bowl body. The second lateral direction is perpendicular to the first lateral direction. The layers of the second type include respective ones of the lamination segments having widths extending in the second lateral direction with respect to the bowl body and are coupled together along joints extending in the first lateral direction with respect to the bowl body.

In the mixing bowl of ¶ 60, the layers of each of the first and second types can be configured such that each of the respective layer segments therein have a common height in the direction of the height of the bowl body such that each of the layers defines a height.

In the mixing bowl of ¶ 61, the height of each layer can be approximately 1 inch.

In the mixing bowl of any one of ¶¶ 60 to 62, the widths of the lamination segments in the first layer type and the widths of the lamination segments in the second layer type can be between 2.5 inches and 3.5 inches.

In the mixing bowl of any of ¶¶ 60 to 63, the lamination segments in the first layer type and the lamination segments in the second layer type can be coupled together along the respective joints using an adhesive.

In the mixing bowl of any of ¶¶ 60 to 64, the alternating layers of first and second types can be coupled together using an adhesive.

In the mixing bowl of any of ¶¶ 60 to 65, the wood can be walnut.

In the mixing bowl of any of ¶¶ 60 to 66, the lamination segments can be shaped portions of laminated boards having widths corresponding with the respective widths of the lamination segments, the widths of the lamination segments extending across a grain direction of the laminated boards.

The mixing bowl of any of ¶¶ 60 to 67 can further include a coating of a polymeric material applied over at least a majority of the bowl body.

The mixing bowl of any of ¶¶ 60 to 68 can further include a mounting base coupled with the bowl body on the exterior thereof and configured to couple the mixing bowl with a retention feature of a stand mixer.

According to another aspect of the present disclosure, a method for making a mixing bowl includes assembling a plurality of lamination layers from a respective plurality of wood boards. Each of the wood boards define a width across a grain structure of the board and are coupled together at respective joints therebetween extending along respective lengths of the wood boards. The lamination layers each have a height corresponding with a thickness of the wood boards in directions normal to the widths and lengths thereof. The method also includes joining the lamination layers together in a direction corresponding with the respective heights of the lamination layers to form a blank. The lamination layers are successively arranged in alternating first and second orientations. The first orientation is such that the respective lengths of the wood boards extend in a first direction, and the second orientation is such that the respective lengths of the wood boards extend in a second direction perpendicular to the first direction. The method further includes shaping the blank into a bowl body defining an exterior and an interior cavity.

In the method of ¶ 70, the height of each of the lamination layers can be approximately 1 inch.

In the method of either ¶ 70 or ¶ 71, the widths of the wood boards can be between 2.5 inches and 3.5 inches.

In the method of any of ¶¶ 70 to 72, the lamination layers can be joined together along mutual interfaces therebetween using an adhesive.

In the method of any of ¶¶ 70 to 73, assembling the plurality of lamination layers can include coupling the wood boards together along the respective joints using an adhesive.

In the method of any of ¶¶ 70 to 74, shaping the blank into the bowl body is such that wood boards are respectively reconfigured as lamination segments that are shaped portions of the respective boards having widths corresponding with the respective widths of the lamination segments, the widths of the lamination segments extending across a grain direction of the laminated boards.

The method of any of ¶¶ 70 to 75 can further include applying a coating of a polymeric material over at least a majority of the bowl body.

The method of any of ¶¶ 70 to 76 can further include coupling a mounting base with the bowl body on the exterior thereof and configured to couple the mixing bowl with a retention feature of a stand mixer.

In the method of any of ¶¶ 70 to 77, the step of shaping the blank into the bowl body can be carried out by selectively removing material from the blank using a mechanical process.

In the method of any of ¶¶ 70 to 78, joining the plurality of lamination layers together can include joining a first lamination layer in the first orientation with a second lamination layer in the second orientation and joining a third lamination layer in the first orientation with the second lamination layer opposite the first lamination layer, the joints between the boards in the first lamination layer being offset from the boards in the third lamination layer in the second direction.

According to another aspect of the present disclosure, a mixing bowl for a stand mixer includes a bowl body defining an exterior and an interior cavity and shaped from a blank having plurality of lamination layers. Each of the lamination layers are assembled from a respective plurality of wood boards. Each of the wood boards defines a width across a grain structure of the board and coupled together at respective joints therebetween extending along respective lengths of the wood boards. The lamination layers each have a height corresponding with a thickness of the wood boards in directions normal to the widths and lengths thereof. The lamination layers are joined together in a direction corresponding with the respective heights of the lamination layers to form the blank. The lamination layers are successively arranged in alternating first and second orientations. The first orientation has the respective lengths of the wood boards extending in a first direction, and the second orientation has the respective lengths of the wood boards extending in a second direction perpendicular to the first direction. The mixing bowl for the stand mixer further includes a coating applied over at least a majority of the bowl body and a mounting base coupled with the bowl body on the exterior thereof and configured to couple the mixing bowl with a retention feature of a stand mixer.

According to another aspect of the present disclosure, a mixing bowl for a stand mixer includes an outer body consisting essentially of wood and defining an exterior and an interior cavity and a liner consisting essentially of metal and coupled within the interior cavity of the outer body so as to define an interior surface of the mixing bowl. A mounting base is coupled with the outer body on the exterior thereof and is configured to couple the mixing bowl with a retention feature of the stand mixer.

In the mixing bowl of ¶ 81, the outer body can define an upper edge between the exterior and the interior cavity and a groove extending inwardly from an interior wall defining the interior cavity adjacent the upper edge, and the liner can include an upper flange received in the groove.

In the mixing bowl of ¶ 82, the outer body can define a first material thickness along the interior wall adjacent the groove, the outer body can define a second material thickness at a junction between the upper edge and the groove, and the second material thickness can be greater than the first thickness such that the junction is generally flush with the interior surface of the mixing bowl, as defined by the liner.

In the mixing bowl of ¶¶ 82 or 83, the outer body may comprise a lower portion and an upper portion joined with the lower portion at an interface, and the lower portion and the upper portion may collectively define the groove extending from the interface.

In the mixing bowl of ¶ 84, the lower portion of the body may comprise multiple layers of wood coupled together.

In the mixing bowl of any of ¶¶ 81 to 85, the outer body can define a first material thickness of between 10 mm and about 15 mm along a portion thereof with which the liner is coupled, and the liner can define a second material thickness of between 2 mm and 3 mm.

In the mixing bowl of any of ¶¶ 81 to 86, the liner can be coupled with the outer body by an adhesive layer at least partially disposed therebetween.

In the mixing bowl of ¶ 81, the liner can be defined as a metal plating layer within the interior cavity of the outer body.

In the mixing bowl of ¶ 88, the plating layer can overlie a metallic paint layer applied over an interior wall of the outer body, and the interior surface of the plating layer can be polished.

According to yet another aspect, a mixing bowl for a stand mixer includes an outer body consisting essentially of wood and defining an exterior, an interior cavity, an upper edge between the exterior and the interior cavity, and a groove extending inwardly from an interior wall defining the interior cavity adjacent the upper edge. The mixing bowl also includes a liner having an upper flange, consisting essentially of metal, and being coupled within the interior cavity of the outer body at least by receipt of the upper flange within the groove of the outer body so as to define an interior surface of the mixing bowl.

The mixing bowl of ¶ 90 may further include a mounting base coupled with the outer body on the exterior thereof and configured to couple the mixing bowl with a retention feature of a stand mixer.

In the mixing bowl of ¶¶ 90 or 91, the outer body can define a first material thickness along the interior wall adjacent the groove, and the outer body can define a second material thickness at a junction between the upper edge and the groove, the second material thickness being greater than the first thickness such that the junction is generally flush with the interior surface of the mixing bowl, as defined by the liner.

In the mixing bowl of any of ¶¶ 90 to 92, the outer body may comprise a lower portion and an upper portion joined with the lower portion at an interface, and the lower portion and the upper portion may collectively define the groove extending from the interface.

In the mixing bowl of ¶ 93, the lower portion of the body can comprise multiple layers of wood coupled together.

In the mixing bowl of any of ¶¶ 90 to 94, the outer body can define a first material thickness of between 10 mm and about 15 mm along a portion thereof with which the liner is coupled, and the liner can define a second material thickness of between 2 mm and 3 mm.

According to yet another aspect, a method for making a mixing bowl for a stand mixer can include coupling a metal liner within an interior cavity of an outer body so as to define an interior surface of the mixing bowl. The outer body consists essentially of wood and defines an exterior and the interior cavity. The method further includes coupling a mounting base with the outer body on the exterior thereof. The mounting base is configured to couple the mixing bowl with a retention feature of a stand mixer.

In the method of ¶ 96, the outer body can define an upper edge between the exterior and the interior cavity and a groove extending inwardly from an interior wall defining the interior cavity adjacent the upper edge, and coupling the metal liner with the outer body can include positioning an upper flange of the liner in the groove.

In the method of ¶ 97, the outer body can comprise a lower portion and an upper portion, and positioning the upper flange of the liner in the groove can include joining the upper portion with the lower portion at a junction, the lower portion and the upper portion collectively defining the groove extending from the interface with the upper flange of the liner positioned therein.

In the method of ¶ B16, the liner can be coupled within the interior cavity of the outer body by applying the liner as a metal plating layer to the outer body by a metallic plating process.

In the method of ¶ 99, the metallic plating process may include an initial step of applying a metallic paint layer to an interior wall of the outer body, and the method may further include polishing the plating layer along the interior surface of the mixing bowl.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mixing bowl, comprising:

a bowl body defining an exterior and an interior cavity and comprising a plurality of lamination segments, the lamination segments consisting essentially of wood and being arranged in alternating layers of first and second types along a height of the bowl body with:

the layers of the first type including respective ones of the lamination segments having widths extending in a first lateral direction with respect to the bowl body and coupled together along joints extending in a second lateral direction with respect to the bowl body, the second lateral direction being perpendicular to the first lateral direction; and the layers of the second type including respective ones of the lamination segments having widths extending in the second lateral direction with respect to the bowl body and coupled together along joints extending in the first lateral direction with respect to the bowl body; and a mounting base coupled with the bowl body on the exterior thereof and configured to couple the mixing bowl with a retention feature of a stand mixer.

2. The mixing bowl of claim 1, wherein the layers of each of the first and second types are configured such that each of the respective layer segments therein have a common height in the direction of the height of the bowl body such that each of the layers defines a height.

3. The mixing bowl of claim 2, wherein the height of each layer is approximately 1 inch.

4. The mixing bowl of claim 1, wherein the widths of the lamination segments in the first layer type and the widths of the lamination segments in the second layer type are between 2.5 inches and 3.5 inches.

5. The mixing bowl of claim 1, wherein the lamination segments in the first layer type and the lamination segments in the second layer type are coupled together along the respective joints using an adhesive.

6. The mixing bowl of claim 1, wherein the alternating layers of first and second types are coupled together using an adhesive.

7. The mixing bowl of claim 1, wherein the wood is walnut.

8. The mixing bowl of claim 1, wherein the lamination segments are shaped portions of laminated boards having widths corresponding with the respective widths of the lamination segments, the widths of the lamination segments extending across a grain direction of the laminated boards.

9. The mixing bowl of claim 1, further comprising a coating of a polymeric material applied over at least a majority of the bowl body.

10. A mixing bowl for a stand mixer, comprising:

a bowl body defining an exterior and an interior cavity and shaped from a blank having plurality of lamination layers, wherein:

each of the lamination layers are assembled from a respective plurality of wood boards, each of the wood boards defining a width across a grain structure of the wood board and coupled together at respective joints therebetween extending along respective lengths of the wood boards, the lamination layers each having a height corresponding with a thickness of the wood boards in directions normal to the widths and lengths thereof; and the lamination layers are joined together in a direction corresponding with the respective heights of the lamination layers to form the blank, the lamination layers being successively arranged in alternating first and second orientations, the first orientation having the respective lengths of the wood boards extending in a first direction and the second orientation having the respective lengths of the wood boards extending in a second direction perpendicular to the first direction;

a coating applied over at least a majority of the bowl body; and a mounting base coupled with the bowl body on the exterior thereof and configured to couple the mixing bowl with a retention feature of a stand mixer.

11. The mixing bowl of claim 10, wherein the layers of each of the first and second types are configured such that each of the respective layer segments therein have a common height in the direction of the height of the bowl body such that each of the layers defines a height.

12. The mixing bowl of claim 11, wherein:

the height of each layer is approximately 1 inch; and the widths of the lamination segments in the first layer type and the widths of the lamination segments in the second layer type are between 2.5 inches and 3.5 inches.

13. The mixing bowl of claim 10, wherein:

the lamination segments in the first layer type and the lamination segments in the second layer type are coupled together along the respective joints using an adhesive; and the alternating layers of first and second types are coupled together using an adhesive.

14. The mixing bowl of claim 10, wherein the lamination segments are shaped portions of laminated boards having widths corresponding with the respective widths of the lamination segments, the widths of the lamination segments extending across a grain direction of the laminated boards.

* * * * *